United States Patent [19]

Boehle

[11] Patent Number: 5,212,655
[45] Date of Patent: May 18, 1993

[54] CLEARANCE MEASUREMENT SYSTEM, VIDEO CLEARANCE MEASUREMENT VEHICLE AND IMPROVED METHOD OF PERFORMING CLEARANCE MEASUREMENTS

[75] Inventor: Joseph B. Boehle, Jacksonville, Fla.

[73] Assignee: CSX Transporation, Inc., Jacksonville, Fla.

[21] Appl. No.: 616,996

[22] Filed: Nov. 21, 1990

[51] Int. Cl.[5] .................. G06F 15/74; H04N 7/18
[52] U.S. Cl. .................. 364/516; 358/107; 364/506; 364/560
[58] Field of Search ........... 364/516, 505, 506, 560, 364/561, 562, 563, 443, 424.02; 358/103, 107

[56] References Cited

U.S. PATENT DOCUMENTS

| | | | |
|---|---|---|---|
| 4,700,223 | 10/1987 | Shoutaro et al. | 358/103 |
| 4,809,178 | 2/1989 | Ninomiya et al. | 364/443 |
| 4,825,393 | 4/1989 | Nishiya | 364/516 X |
| 4,888,720 | 12/1989 | Fryer | 364/506 |
| 4,926,346 | 5/1990 | Yokoyama | 364/424.02 |
| 4,970,653 | 11/1990 | Kenue | 364/424.02 X |
| 4,985,847 | 1/1991 | Shioya et al. | 364/516 |
| 5,073,819 | 12/1991 | Gates et al. | 364/560 |
| 5,075,772 | 12/1991 | Gebel | 358/107 |

Primary Examiner—Kevin J. Teska
Attorney, Agent, or Firm—Burns, Doane, Swecker & Mathis

[57] ABSTRACT

A clearance measurement system including a video clearance measurement vehicle. The vehicle includes a video camera and a light source which emits a beam of light in a vertically and laterally extending plane. The vehicle can be driven on a railroad track at night to record illuminated portions of obstacles located along the railroad track. Various notes are overlaid on a videotape of the recorded images. The videotapes are used to prepare clearance diagrams or are analyzed by software to determine whether a reference object will pass freely along the track without hitting any of the obstacles.

21 Claims, 9 Drawing Sheets

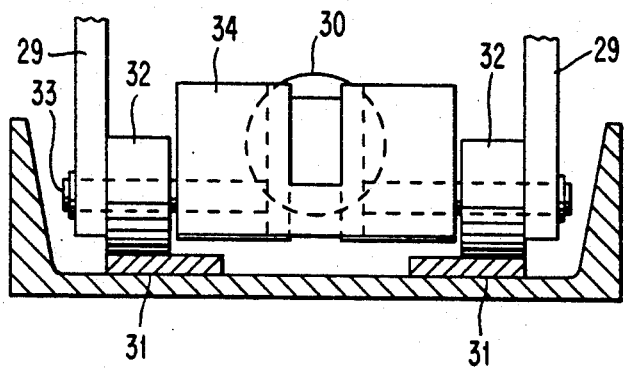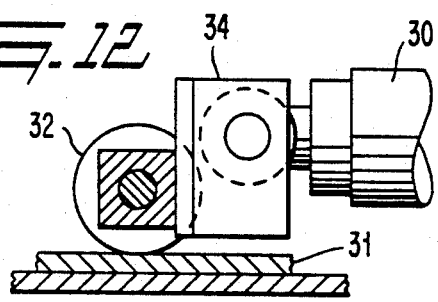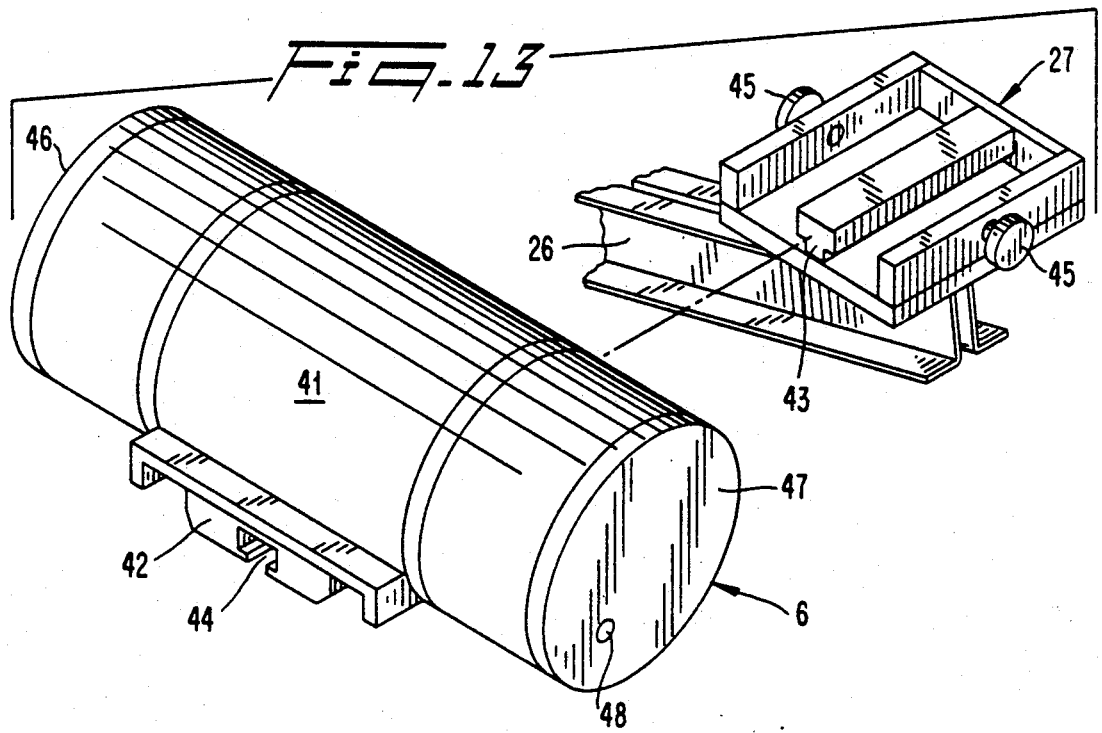

CLEARANCE MEASUREMENT SYSTEM, VIDEO CLEARANCE MEASUREMENT VEHICLE AND IMPROVED METHOD OF PERFORMING CLEARANCE MEASUREMENTS

BACKGROUND AND SUMMARY OF THE INVENTION

The present invention relates to clearance measurement systems, a clearance measurement vehicle and a method for performing clearance measurement calculations.

Most of the clearance measurement systems utilized by U.S. and Canadian railroads are very antiquated and were created as many as 30 years ago. Several railroads do not own clearance measurement systems and employ contractors to provide the structural data at a costly price. A clearance measurement system is basically designed to ensure that a particular size of railway car load can travel along its intended track section.

The assignee of the present invention previously developed a clearance vehicle which rides along a railroad track by means of a rail guide attachment. The vehicle also includes a mercury bulb mounted on an "A" frame in front of the vehicle and a 35 mm camera mounted on top of the vehicle. As the vehicle travels along the track, it takes still photographs at various locations to record any obstructions present alongside and over the track. The photographs are enlarged to the required scale and an obstruction outline is plotted on clearance diagrams. These clearance diagrams are used by specialized personnel called "clearance engineers" to determine routing of shipments of excessive height and/or width.

Prior to development of the photographic system described above, a "finger car" was used for obtaining clearances. The finger car was moveable along the railroad track and included a vertically extending inverted U-shaped frame with rods (fingers) extending outwardly from the frame. Each rod, or finger, required reading to determine the amount of bend caused by touching various obstructions. This method was fairly precise, but required several workers.

According to the previously used photographic method and finger car method, a hand drawn clearance diagram was used to determine if a customer's unusually large shipment would safely pass the structures adjacent to the railroad track. These systems require too much manpower and take too much time to complete a clearance measurement. Accordingly, a need exists in the art for a clearance measurement system which requires less manpower and which can be performed in an efficient manner. Furthermore, the movement of dimensional shipments is growing approximately 30% each year necessitating a more efficient and accurate measurement system. Such an improved system would be a major breakthrough for the clearance measurement process for all railroads.

The photographic system utilizes a Chevrolet Suburban highrail vehicle having a 35 mm camera mounted to the top of it. In front of the vehicle, an intense light beam is emitted in a circular pattern perpendicular to the direction of movement. This light beam or plane is approximately eighteen feet measured horizontally from the camera. The vehicle measures clearances after dark. As the vehicle travels down the tracks, the operator stops the vehicle when the light beam illuminates structures adjacent to the track and a photograph is taken. In view of the fact that the camera is located a certain distance from the light beam, the diagram scale is constant. The film is later developed and placed on a view graph machine so that the structure can be drawn on a piece of mylar and a clearance diagram can be produced.

Accordingly, it is an object of the present invention to provide a new clearance measurement system. Such a new system should provide an increased amount of data, facilitate the assessment of moving a specific reference object along the path, improve the ability to alter certain structures to permit clearance, and numerous other objects will be apparent from the following.

According to the present invention, a clearance control system is provided for measuring clearances at locations which are spaced apart along a path of movement. The system includes a vehicle moveable along the path of movement, radiation transmitting means supported on the vehicle for providing a beam of energy which reflects off portions of outer peripheries of obstacles and recording means for recording signals corresponding to coordinates of the obstacles.

The recording means is supported by the vehicle in fixed relationship thereto such that the recording means can continuously record the signals while the vehicle moves along the path of movement. The recording means receives reflections of the beam of energy off the portions of the outer peripheries of the obstacles and the signals recorded by the recording means correspond to coordinates of the portions of the outer peripheries of the obstacles.

The system preferably includes moveable support means for moving the recording means between first and second spaced-apart positions. The first position corresponds to a predetermined location at which the recording means can record the signals. The second position corresponds to a location at which the moveable support means can be stored while the vehicle travels from one clearance measurement site to another clearance measurement site.

The system preferably includes means for receiving the signals from the recording means and for storing data corresponding to coordinates of the obstacles. The system can further include means for determining whether a reference object will pass freely along the path of movement without hitting any of the obstacles. The determining means can comprise a clearance diagram or computerized clearance software.

According to the preferred embodiment, the recording means comprises a video camera and the means for receiving the signals comprises data storage means for storing data continuously received from the video camera. The data corresponds to graphic coordinates of obstacles along the path of movement. The data also represents structural coordinates of the obstacles in relation to at least one fixed reference point at various locations along the path of movement. The data storage means can include a data disk on which graphic files are stored. The data is preferably in digitized form and data processing means comprising clearance program software can also be used to perform calculations using the data to determine whether the reference object will pass freely along the path of movement without hitting any of the obstacles.

The inventive system preferably includes a monitor for displaying an image corresponding to the data at a selected location along the path of movement. A data display computer can be provided for overlaying information on the videotape.

According to the preferred embodiment, the path of movement comprises a railroad track and the obstacles comprise obstructions located adjacent to the railroad track. The vehicle can include one or more reference points within the field of view of the video camera. The video tapes can be stored at a single location. A clearance engineer uses the videotapes to determine whether a reference load can be carried by a train safely along a particular route on the railroad track. This determination can be performed using clearance diagrams or by computerized clearance software adapted to process the recorded data representing coordinates of obstacles located along the railroad track and data representing the reference load.

BRIEF DESCRIPTION OF THE DRAWING FIGURES

The invention will be described with reference to the accompanying drawings, wherein like members bear like reference numerals and wherein:

FIG. 11 is a cross-section taken along the lines XI—XI in FIG. 2;

FIG. 12 is a side view of the arrangement shown in FIG. 11; and

FIG. 13 is a view illustrating details of the camera and camera mount in accordance with the invention.

DETAILED DESCRIPTION OF THE PREFERRED EMBODIMENTS

The present invention provides an improved clearance measurement system for measuring clearances at locations which are spaced apart along a path of movement. To measure the clearances, a radiation transmitting means is used to provide a beam of energy which reflects off portions of outer peripheries of obstacles located along and facing the path of movement. The reflected beam of energy is received by recording means which records signals corresponding to coordinates of the portions of the outer peripheries of the obstacles. The coordinates are measured in a plane which is perpendicular to the path of movement.

The invention also provides a means for receiving the signals from the recording means and for storing data corresponding to the coordinates of the portions of the outer peripheries of the obstacles located closest to the path of movement. The data is used to determine whether a reference object will pass freely along the path of movement without hitting any of the obstacles.

In the preferred embodiment, the present invention provides a clearance measurement system useful for routing shipments over railroad tracks. The system includes a video clearance measurement vehicle for collecting data in the form of video tapes which can later be used in performing clearance measurements. The clearance measurement system according to the invention is superior to any other existing clearance measurement device in terms of production and costs. In particular, the invention utilizes video technology and computer assisted drafting technology, thereby obviating the costly and time consuming development process required with the prior clearance measurement systems including the still photographic system. Furthermore, although both the video and photographic systems require only one operator, the video system can measure clearances approximately twice as fast as the photographic system. In addition, the video system can measure clearances in foul weather such as rain, snow or sub-freezing conditions. Basically, the video system utilizes automated equipment both for the field measurement (photography) and office analyzation.

Figure 1:
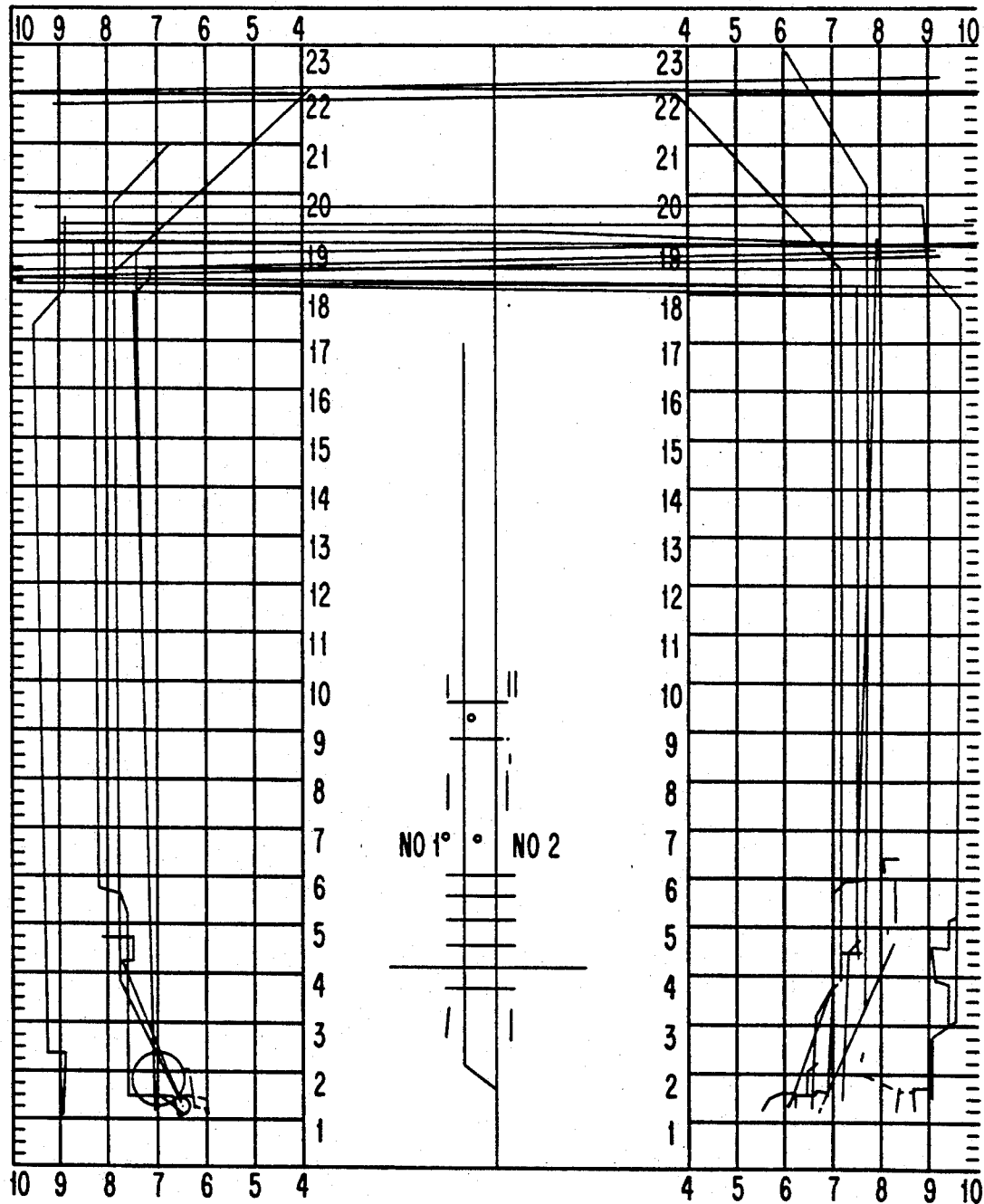
FIG. 1 is a representative clearance diagram prepared by computer assisted drafting technology in accordance with the invention.

One aspect of the invention is to use computer assisted drafting technology in conjunction with a video picture background to actually draw structures adjacent a railroad track. At present, the computer assisted drafting technology can be used to prepare a clearance diagram 1, as shown in FIG. 1. Such a clearance diagram includes information regarding obstacles located alongside and over one or more tracks over a particular distance such as several miles. Specialized personnel called "clearance engineers" review the clearance diagrams to determine routing of shipments of excessive height and/or width. A detailed description of the various notations and graphic representations in FIG. 1 are not required for a complete understanding of the present invention and are known to those skilled in the art.

Figure 2:
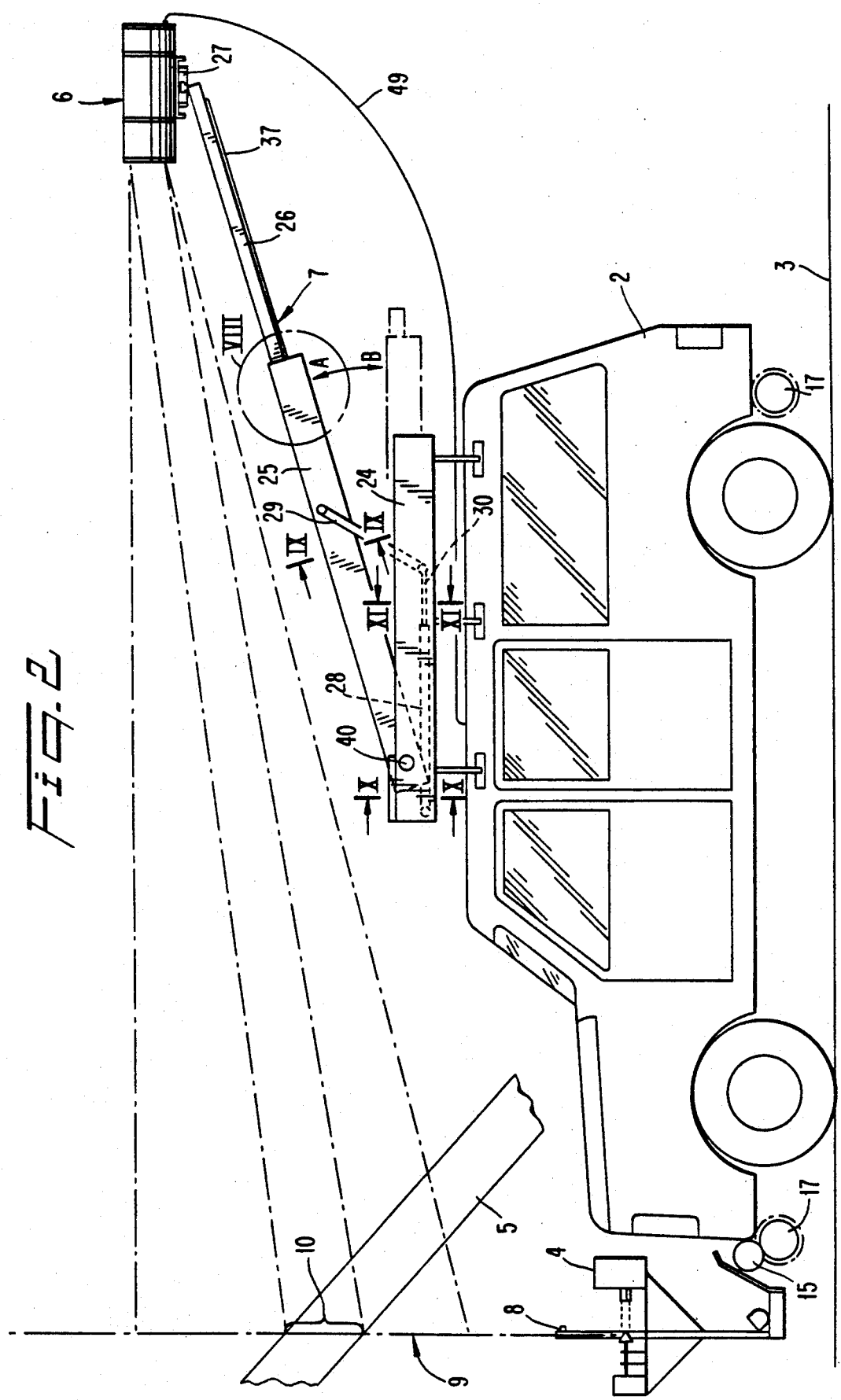
FIG. 2 is a view of a video clearance measurement vehicle in accordance with the invention.

A video clearance measurement vehicle 2 in accordance with the invention is shown in FIG. 2. The vehicle 2 is moveable along a path of movement 3 such as a railroad track and includes a radiation transmitting means such as a light source 4 for illuminating obstacles 5 along the path of movement. A recording means such as a video camera 6 is supported on support means 7 located on top of the vehicle. At least one reference point 8 is provided within the field of view of the camera 6. The light source 4 projects a beam of light 9 which extends in a vertical plane which is perpendicular to the path of movement. As the vehicle travels at night along the path of movement 3, various portions 10 of the obstacles 5 are illuminated by the beam of light 9. The video camera 6 continuously records the illuminated portions 10 of the obstacles 5 which are located closest to the track in the vertical and horizontal directions. The recorded images of the illuminated portions 10 are used to generate the clearance diagrams such as the clearance diagram shown in FIG. 1.

Various problems were encountered in designing the video clearance measurement system according to the invention. For instance, a video camera views larger width than height but just the opposite is needed in measuring clearances along a railroad track. In particular, the desired field of view from the rail is 23 feet vertical and 10 feet laterally on each side of the railroad track. This problem was overcome by providing a wide angle lens and by carefully locating the video camera. In the presently preferred embodiment, a 5.5 mm perfect wide-angle lens is utilized which lens has to be located approximately 21 feet from the light beam 9 to achieve the desired field of view. However, this required that the camera 6 had to be supported by suitable support means capable of supporting the camera in a stable position above and behind the roof structure of the vehicle 2.

Another problem associated with constructing the video clearance measurement system was the provision of a suitable power supply. To overcome this problem, a 1200 Watt invertor, a 180 amp alternator and two large diesel batteries were installed in the vehicle 2. With this arrangement, the power supply changes 12 vDC to 120 vAC. This allows all of the video equipment and other electrical components of the video clearance measurement system to simply be plugged into an AC source.

Figure 3:
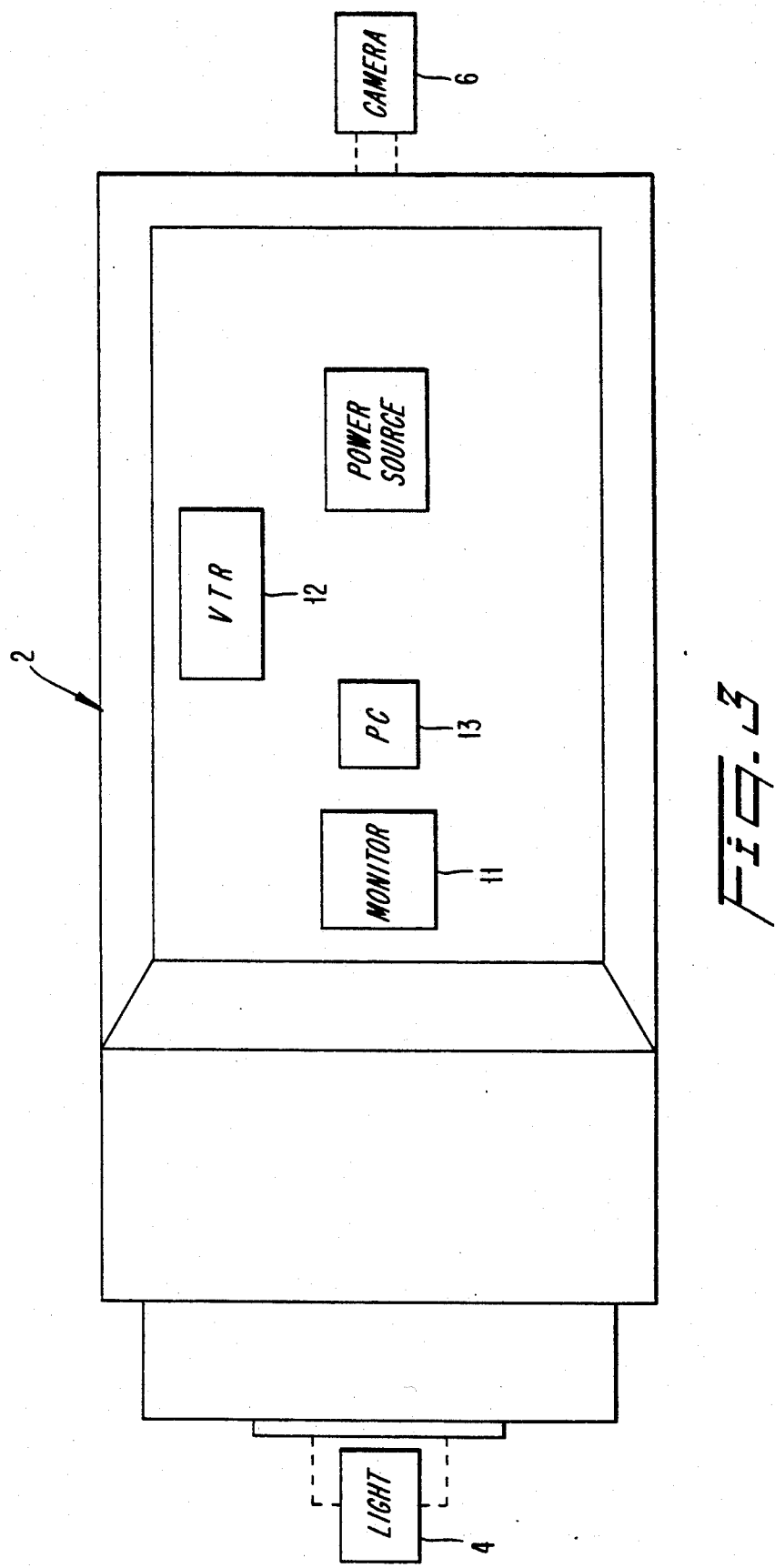
FIG. 3 is a general layout of the interior of the vehicle shown in FIG. 2.

The vehicle 2 includes cabinets to house the various video components, the invertor and the diesel batteries. FIG. 3 shows a layout in the vehicle 2 of various video components including a video monitor 11 and a ¾ inch VTR 12. The system also includes a camera control unit and a center console control unit, both of which are not shown in FIG. 3.

Figure 4:
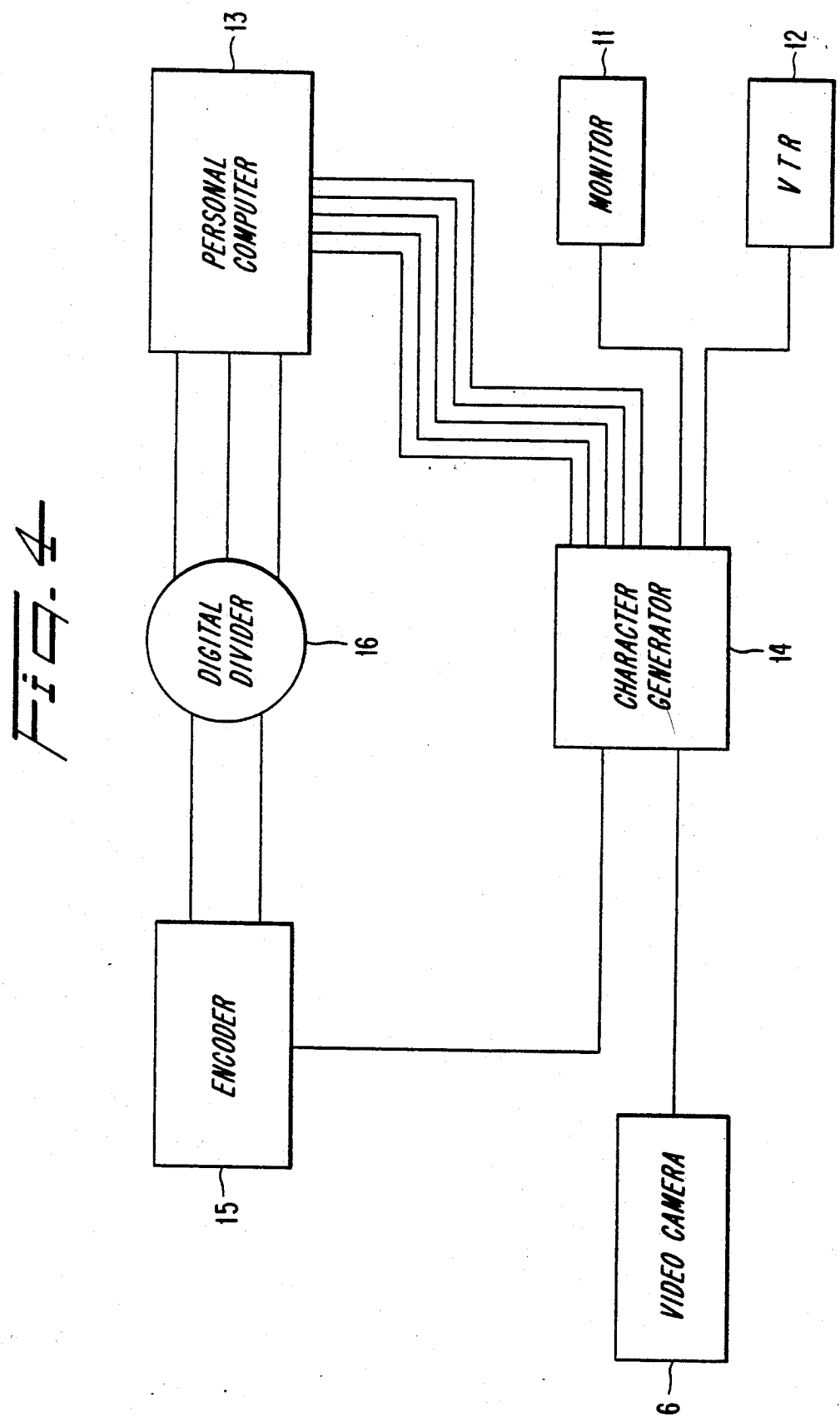
FIG. 4 is a flow diagram of hardware connections of components of the clearance measurement system according to the invention.

In order to allow one operator to perform clearance measurements with the vehicle 2, an on-board laptop computer 13 is provided so that the operator can take notes during the clearance measurements. In order to overlay information such as division, sub-division, milepost, footage, and date onto the video tape recorded by the VTR 12, a character generator 14, an encoder 15 and a digital divider 16 are also provided, as shown in FIG. 4. With the software installed in the arrangement shown in FIG. 4, the operator can simply hit the spacebar of the personal computer 13 at each milepost and the system will change the milepost and count footage information recorded on the video tape accordingly. This feature allows the length of a structure to also be measured in order to better estimate what is required to improve clearance through such a structure.

Figure 5:
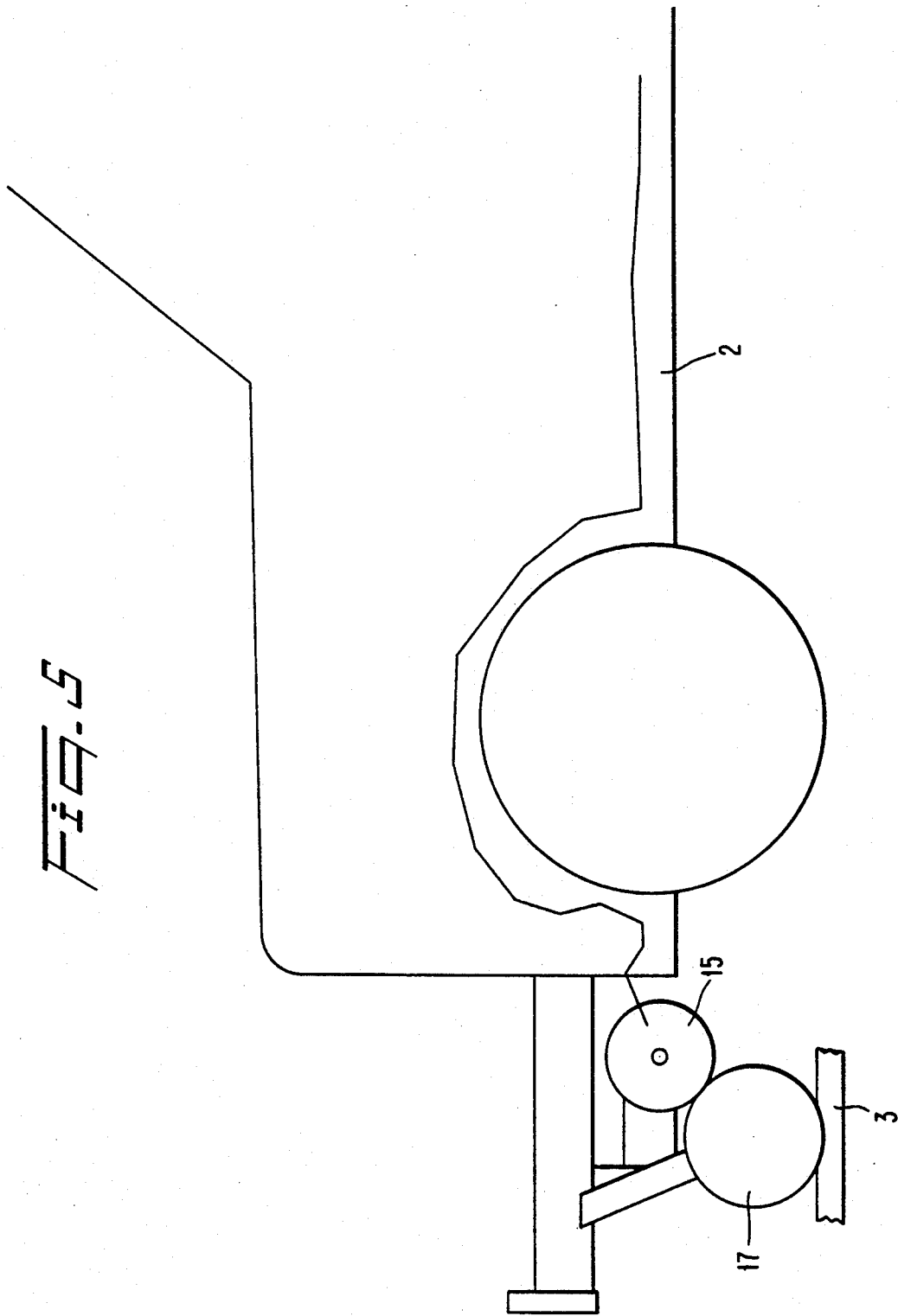
FIG. 5 is a schematic view of an encoder utilized in the clearance measurement system according to the invention.

FIG. 5 shows how the encoder 15 cooperates with a rail guide attachment 17 which allows the vehicle 2 to be supported on the track 3. With the encoder 15, it is possible to accurately correlate distances along the track 3 with locations of obstacles along the track 3 irrespective of the speed of the vehicle 2. That is, the video camera 6 can continue to record images continuously when the vehicle is traveling forwards and backwards and when the vehicle is stopped with the precise location of the vehicle at each point along the track being displayed directly on the videotape.

Figure 6:
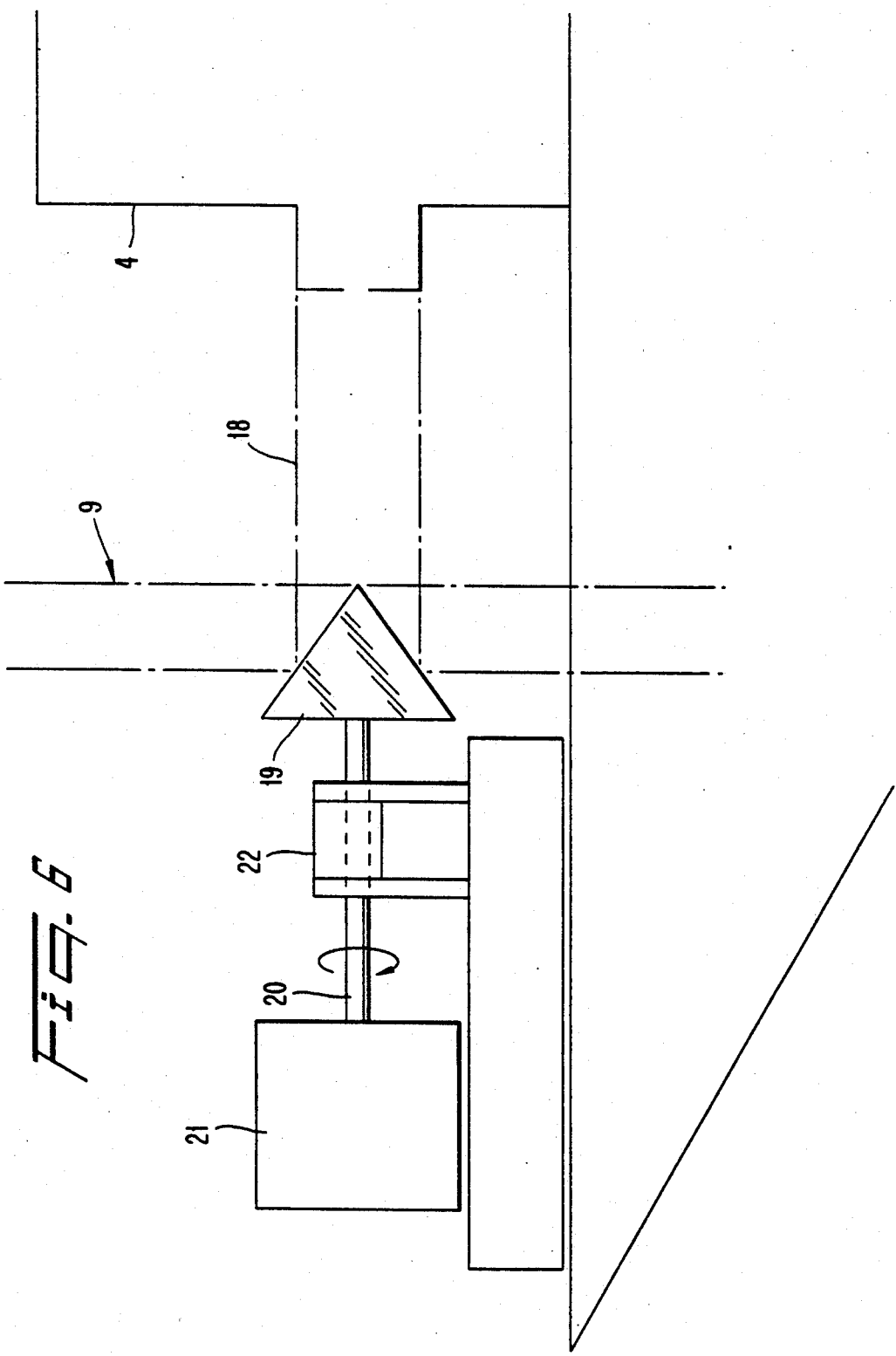
FIG. 6 is a schematic view of a light source used in the clearance measurement system according to the invention.

Further details of the light source 4 are shown in FIG. 6. In particular, the light source 4 concentrates light into a horizontal collimated beam 18. The collimated light beam 18 is reflected to form the plane of light 9 by means of a rotating prism 19. The prism 19 can face towards or away from the vehicle 2. In the arrangement shown in FIG. 6, the prism 19 faces the vehicle and the light source 4 is mounted between the vehicle 2 and the prism 19. The prism 19 is a right angle prism having a mirrored surface and rotating at a suitable speed such as 1200 rpm. The rotation creates a fixed 360° beam or plane of light 9. The prism 19 is mounted on the end of a rotatable shaft 20 which is rotated by a motor 21. To provide stability, a support 22 is provided for the shaft 20.

Figure 7:
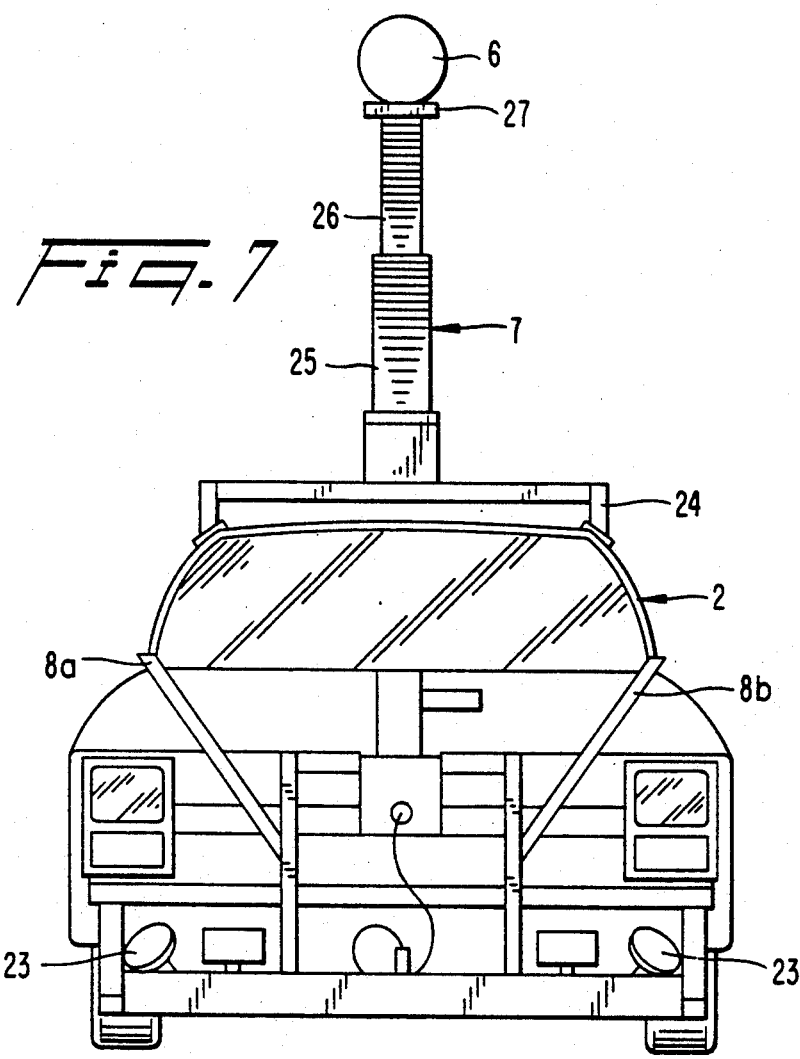
FIG. 7 is a front view of the vehicle shown in FIG. 2.

After the clearance measurements are made in the field, the video tapes can be analyzed in a central office. The office can include a video playing machine which is used along with a computer and software to analyze the video tapes. The computer can be a 300 megabyte computer and the software can be AutoCad software. A clearance diagram has been developed in AutoCad from a videotape of a test structure. This clearance diagram is preferably overlayed onto an 18 inch video monitor. The structure has been surveyed to determine exactly where it is located in relation to the test track. The video clearance measurement vehicle 2 according to the invention preferably includes two fixed reference objects 8a, 8b within the field of view of the camera (as best shown in FIG. 7). The fixed objects may be structures on the vehicle and/or point light sources attached to the vehicle such as optical fiber lights. The fixed objects 8a, 8b are used as reference points in each videotape. The clearance diagram of FIG. 1 was developed from a videotape of the test structure and produced a ½ inch=1 foot scale.

The camera position is changeable on the vehicle 2 and the clearance diagram scale can also be changed. These positions can be adjusted to provide optimum camera stability and the desired clearance envelope. When the videotape is reviewed, the clearance engineer can freeze or slowdown the video without any distortion in the picture. In this manner, the light beam can be drawn in AutoCad on the clearance diagram which will show where the particular structure locates in relation to the track.

Clearance diagrams are stored as electronic data by track segment. The layers or structures are all labeled and the X and Y coordinates of each are digitized. These coordinates can be entered into a computerized clearance program. In particular, after drawing several completed structures, the AutoCad diagram including structure lines are saved as a graphic file. The clearance diagram for each track segment can be plotted and clearance engineers can check their shipment dimensions against the plotted structures. To obviate the manual task of comparing shipment dimensions against plotted structures, a computerized clearance program can be used to manipulate the graphic file over a particular track segment and electronically clear loaded shipments.

A time base corrector can be utilized to slow down and freeze the video image. There are unique advantages to the slow motion video playback. For instance, the clearance engineer can determine the position of the beam in relation to the track geometry. This allows the clearance engineer to determine whether the vehicle is in a curve, spiral or tangent track. Such information will make quite a difference in the clearance profile of the structure. Also, the clearance engineer can determine exactly what needs to be done to a particular structure for improvements in available line clearance. As an example, it has been determined that in order to accommodate larger dimensions, several tunnels only require a portion of the wall to be removed instead of enlarging the entire tunnel. Another advantage of video playback would be for structure inspection. If desired, the structure being filmed could be illuminated by several high output exterior lights 23, as shown in FIG. 7. This will allow inspection of defects from the central office by "blowing up" portions of the videotape.

The clearance engineer can actually draw the structures on the screen utilizing the track notes overlaid onto the videotape depicting track number, milepost location, etc.

The video clearance measurement system has the ability to measure track center distances with AutoCad using the large volume of track videotapes available from the assignee's "Track Geometry Car". The dimensions will be up-to-date and accurate enough for calculating distances for safe passage of trains on adjacent track.

Figure 8:
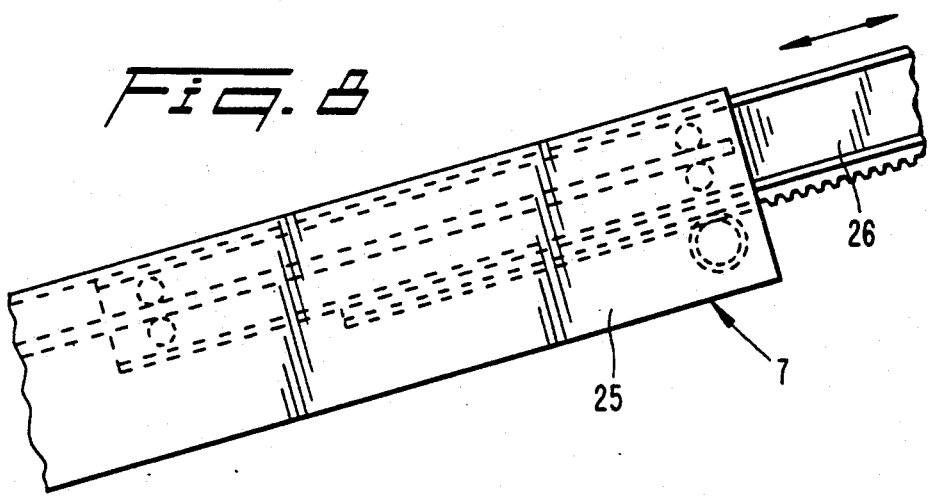
FIG. 8 is an enlarged partial, detail view of the portion VIII shown in FIG. 2.

Details of the support means 7 will now be described. As shown in FIG. 7, the support means 7 is supported on a roof rack 24 and the support means 7 includes a telescopic boom including a first section 25 and an extendible second section 26. The camera 6 is supported on a camera mount 27 located at a free end of the second extendible section 26. The extendible boom can include a rack and pinion arrangement to provide smooth and stable operation, as shown in FIG. 8. Additional details of the telescopic boom are shown in FIGS. 9–13.

As shown in FIG. 2, the support means 7 is moveable between a position A at which the camera is operated and a retracted position B at which the camera 6 is not in use. To move the support means 7 to position A, an actuating means is provided which can include a stationary member 28, a cam follower 29 pivoted at one end thereof to the first section 25 of the boom and pivoted at a second end thereof to a second extendible member 30 guided by the first member 28. When the boom 7 is in position B (the collapsed position), the cam follower 29 is slightly inclined at an angle such as about 15° with respect to a horizontal plane. The roof rack 24 includes parallel tracks 31 on which rollers 32 travel. The rollers 32 are rotatably supported by a shaft 33 extending between spaced-apart arms forming the cam follower 29. The shaft 33 is also connected to the extendible member 30. Accordingly, when extendible member 30 is moved backwards and forward, the rollers 32 travel along the tracks 31 and force the cam follower 29 to pivot about the shaft 33 to raise and lower the boom between the positions A and B.

The shaft 33 is carried by a block 34 attached to the free end of the extendible member 30. A heavy duty spring can be provided coaxially around the extendible member 30 such that when the extendible member 30 is retracted, the block 34 compresses the spring. The spring helps reduce the force necessary to raise the boom 7 from the fully retracted position B since it is compressed by the block 34. In the fully extended position, the cam follower 29 can be angled as shown in FIG. 2 or the cam follower 29 can be perpendicular to the horizontally extending roof rack 24. Limit switches (not shown) can be provided to deactuate a power supply used to retract and extend the extendible member 30. In addition, to provide lateral stability to the boom 7 in the extended position A, shock absorbers (not shown) extending between the section 25 and the roof rack 24 can be provided on opposite sides of the first section 25 of the boom.

Figure 9:
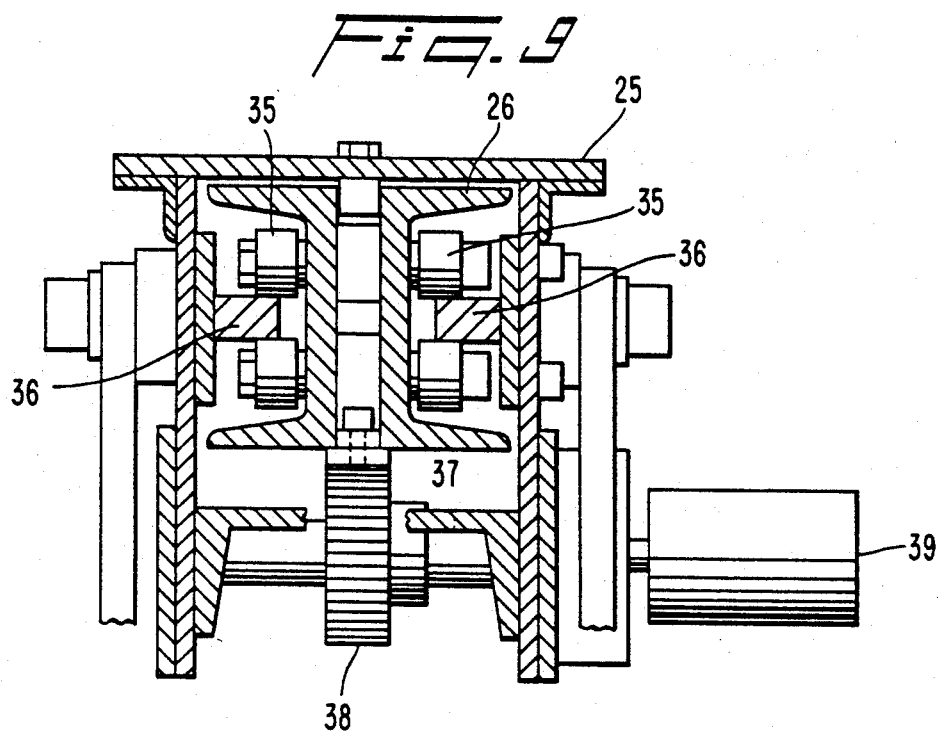
FIG. 9 is a cross-section taken along the lines IX—IX shown in FIG. 2.

FIG. 9 shows details of the extendible boom. In particular, the extendible section 26 of the boom includes rollers 35 on opposite sides of the section 26. Two pairs of rollers 35 can be provided on each side of the section 26 and these pairs of rollers can be spaced apart along the length of the section 26. The first section 25 has an inverted U-shape and includes guide flanges 36 extending inwardly and along the length of inner sidewalls of the section 25. The rollers 35 are provided above and below the guide flanges 36 such that they smoothly guide the section 26 into and out of the section 25. To move the section 26 into and out of the section 25, a gear rack 37 is provided on the underside of the section 26. A gear 38 driven by a motor 39 engages the gear rack 37 to drive the section 26 into and out of the section 25. Limit switches (not shown) deactuate the motor 39 when the section reaches the fully retracted and fully extended positions.

Figure 10:
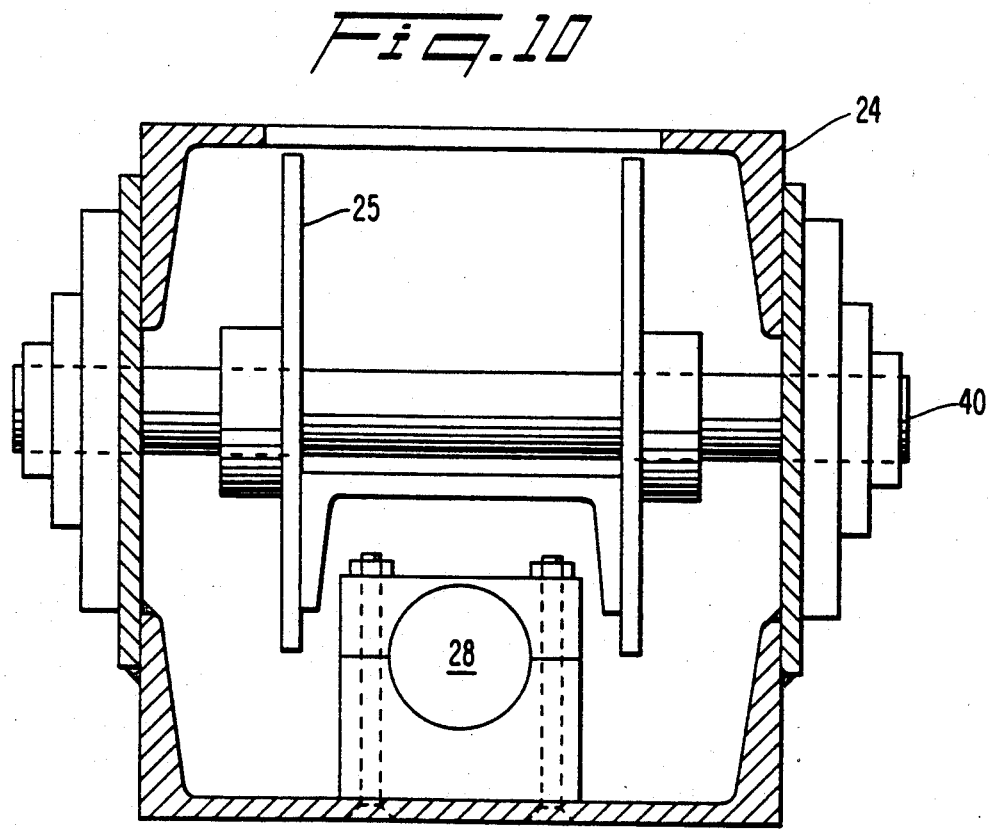
FIG. 10 is a cross-section taken along the lines X—X in FIG. 2.

The section 25 is pivoted to a portion of the roof rack 24 by means of a pivot connection 40, as shown in FIGS. 2 and 10.

FIG. 13 shows details of the camera mount 27. In particular, the camera 6 is held within a camera housing 41 and a fitting 42 is provided on the underside of the camera housing 41 for engaging the camera mount 27. The camera mount 27 includes a T-shaped guide member and the fitting 42 includes a T-shaped slot 44 which engages the guide member 43. Hand screws 45 are provided on the camera mount 27 for clamping the fitting 42 in the camera mount 27. This arrangement permits easy removal of the camera for transportation of the vehicle.

The camera mount 27 is provided at a preset angle at the end of the extendible section 26. The camera housing 41 includes a clear end plate 46 on the front thereof to protect the camera from inclement weather and prevent dirt and debris from entering the camera housing 41. Another end plate 47 is provided on the opposite end of the camera housing 41 and includes a cable connection 48 for connecting a cable 49 to the camera 6. The cable 49 supplies power to the camera and transmits the recorded image to the video components located within the vehicle 2. The camera mount 27 includes a vertically extending flange received in a gap between two U-shaped members forming the extendible section 26. A bolt passes through the U-shaped members and a hole in the flange extending from the camera mount 27 to allow adjustment of the angle between the camera mount 27 and the extendible member 26.

The clearance measurements are made at night. In operation, the camera 6 is mounted on the camera mount 27, the motor 39 is actuated to extend the extendible section 26 of the boom and another motor (not shown) is actuated to raise the boom to the operating position A. The light source 4 is actuated and video images are recorded by the camera 6 while the vehicle 2 is moved along the path of movement. The interior of vehicle 2 is equipped with a center console next to the driver's seat. The monitor 11 is provided in the console to allow the driver to see the images being recorded by the camera and a camera control unit is provided to allow control of the camera iris, background, etc. if necessary. A microphone is also provided to allow the driver to record information directly on the video tape. Such information includes details of the obstacles or structures located along the track. For instance, such information includes the type of structure such as a highway overpass, switch stand, signal case, tangent track, telephone box, the direction of curve of the track, etc. The laptop computer 13 is also provided next to the driver to allow entry of information directly on the videotape. To indicate the milepost location along the track column the driver simply hits the spacebar on the computer 13. This information can be used by a clearance engineer to safely route oversized loads carried by a train from one point to another along the railroad track. Also, routing could be electronically determined. For instance, depending on the particular electrical components of the video clearance measurement system, computerized clearance program software can be used to process the recorded data (on tape, disc, etc.) corresponding to coordinates of the obstacles along the track and process data corresponding to the reference load. Such a program could also take into account such factors as the weight of the load, degree of curvature of the track, proximity of the reference load to passing trains, etc.

According to the preferred embodiment, the video camera comprises a Sony MS 550 high resolution video camera, the VTR comprises a Sony ¾ inch VHS recorder, the monitor comprises a Sony 12 inch color monitor, the invertor comprises a Vaner 1200 Watt invertor, the personal computer comprises a Toshiba laptop computer, and the light system comprises an Oriel 75 Watt light system.

The foregoing has described the principle preferred embodiments and modes of operation of the present invention. However, the invention should not be construed as being limited to the particular embodiments discussed. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A clearance control system for measuring peripheries of obstacles at locations which are spaced apart along a path of movement, the system comprising:
   a vehicle movable on a support surface along the path of movement;
   radiation transmitting means supported on the vehicle for providing a beam of energy which reflects off portions of outer peripheries of obstacles located above the support surface and facing the path of movement, the radiation transmitting means comprising a light system which projects a beam of light in a vertical plane which is perpendicular to the path of movement; and
   recording means for recording signals corresponding to coordinates of the portions of the obstacles, the recording means being supported by the vehicle in fixed relationship thereto such that the recording means continuously records the signals while the vehicle moves along the path of movement, the recording means receiving reflections of the beam of energy off the portions of the obstacles and the signals recorded by the recording means corresponding to coordinates of the portions of the obstacles, the recording means comprising a video camera which records images during movement of the vehicle.

2. The clearance control system of claim 1, further including movable support means for moving the recording means between first and second spaced-apart positions, the first position corresponding to a predetermined location at which the recording means records the signals and the second position corresponding to a location at which the movable support means is stored.

3. The clearance control system of claim 1, further comprising data storage means for storing data received from the video camera, the data storage means including a data disk on which the data is stored.

4. A clearance control system for measuring peripheries of obstacles at locations which are spaced apart along a path of movement and for determining whether a reference object will pass freely along the path of movement without hitting any of the obstacles, the system comprising:
   a vehicle movable on a support surface along the path of movement;
   recording means for recording signals corresponding to coordinates of portions of outer peripheries of obstacles located above the support surface and facing the path of movement, the signals being recorded in relation to at least one fixed reference point, the recording means being supported by the vehicle such that the recording means can record the signals while the vehicle moves along the path of movement;
   means for receiving the signals from the recording means and for storing data corresponding to coordinates of the portions of the obstacles; and
   means for determining whether a reference object will pass freely along the path of movement without hitting any of the obstacles.

5. The clearance control system of claim 4, wherein the recording means comprises a video camera which records images on a videotape of the obstacles along the path of movement.

6. The clearance control system of claim 5, wherein the determining means comprises a clearance diagram.

7. A clearance control system for measuring peripheries of obstacles along a path of movement and for determining whether a reference object will pass freely along the path of movement without hitting any of the obstacles, the system comprising:
   data storage means for storing data continuously received from a video camera, the data corresponding to coordinates of portions of outer peripheries of obstacles facing and surrounding the path of movement, the data representing structural coordinates of the portions of the obstacles in relation to at least one fixed reference point; and
   means for determining whether a reference object will pass freely along the path of movement without hitting any of the obstacles.

8. The clearance control system of claim 7, wherein the data storage means includes a data disk on which graphic files are stored.

9. The clearance control system of claim 7, further including a monitor for displaying an image received from the video camera.

10. The clearance control system of claim 7, further including a data display computer for overlaying information on a video tape of the video camera which supplies the data to the data storage means.

11. The clearance control system of claim 7, wherein the at least one fixed reference point comprises two spaced-apart fixed reference points.

12. The clearance control system of claim 7, wherein the path of movement comprises a railroad track and the means for determining comprises a clearance diagram.

13. The clearance control system of claim 7, wherein the path of movement comprises a railroad track and the obstacles comprise obstructions located adjacent to the railroad track.

14. A clearance control system for measuring peripheries of obstacles along a path of movement, the system comprising:

recording means for recording signals corresponding to coordinates of portions of outer peripheries of obstacles facing and surrounding the path of movement; and data storage means for receiving the signals from the recording means, converting the signals to data corresponding to coordinates of the portions of the obstacles and storing the data, the data representing structural coordinates of the obstacles in relation to at least one fixed reference point.

15. The clearance control system of claim 14, wherein the recording means records images of the obstacles within a zone up to about thirty feet wide and up to about twenty-five feet high from a support surface located along the path of movement.

16. The clearance control system of claim 14, wherein the recording means comprises a video camera which records images on a videotape of the obstacles along the path of movement.

17. The clearance control system of claim 16, further comprising a video monitor for providing a visually observable picture of the images recorded by the camera while the images are being recorded by the camera.

18. The clearance control system of claim 16, further comprising a slow motion video playback for slowing down or freezing video images recorded by the video camera and converting means for converting the visual images recorded by the camera to the data stored in the data storage means.

19. The clearance control system of claim 18, wherein the converting means digitizes the image recorded by the camera and numerical data corresponding to the digitized image is stored by the data storage means.

20. The clearance control system of claim 14, wherein the data storage means receives the signals from a video camera while the video camera records the images of the obstacles.

21. The clearance control system of claim 20, wherein the data storage means includes a disc on which the signals are stored.

* * * * *